Jan. 4, 1944.　　　　P. MATHER　　　　2,338,345
CATALYTIC REACTOR
Filed March 24, 1941

INVENTOR
PERCY MATHER
BY Lee J Gary
ATTORNEY

Patented Jan. 4, 1944

2,338,345

UNITED STATES PATENT OFFICE 2,338,345

CATALYTIC REACTOR

Percy Mather, Chicago, Ill., assignor to Universal Oil Products Company, Chicago, Ill., a corporation of Delaware Application March 24, 1941, Serial No. 384,863

3 Claims. (Cl. 23—288)

This is a continuation-in-part of my co-pending application Serial Number 359,084, filed September 30, 1940, which in turn, is a division of my co-pending application Serial No. 320,815, filed February 26, 1940, which has become Patent No. 2,319,620.

The invention is directed to an improved form of reactor for conducting hyrocarbon conversion reactions in the presence of a mass of solid granular contact material, within which mass carbonaceous or heavy hydrocarbonaceous materials of a deleterious nature, resulting from the conversion reaction, are deposited. It is particularly advantageous for use in catalytically promoted conversion reactions, such as catalytic cracking, dehydrogenation, isomerization, cyclization, reforming, etc., but it is not limited to use in these specific processes nor in processes wherein the contact mass catalyzes the reaction in the true sense of the word, since it will be found useful in any process employing a mass of solid contact material which is either catalytic or non-catalytic and particularly in which relatively low space velocities and/or low pressure drop through the contact mass is advantageous. The term "space velocity" as here used refers to the unit volume of reactants undergoing treatment in a given time per unit volume of space occupied by the catalyst bed or beds.

The reactor herein provided retains the advantages of the reactors described and illustrated in my aforementioned co-pending applications and, in addition, possesses structural improvements over the reactors previously disclosed. In common with the reactors disclosed in the co-pending applications it permits alternate processing of the reactants and reactivation of the catalyst or contact material in situ and permits both processing and reactivation to be conducted under substantially adiabatic conditions.

The term "adiabatic" as herein used refers to that type of operation in which (as applied to endothermic processing of the reactants and exothermic reactivation of the catalyst) except for heat retained in the catalyst or contact mass following reactivation thereof, the heat required for processing the reactants is supplied thereto prior to their contact with the catalyst, and wherein the only heat abstracted from the catalyst during reactivation thereof is that carried away by the reactivating fluid and that lost by incidental radiation from the reactor. An adiabatic operation of this type is to be distinguished from similar operations in which a circulating convective fluid is passed in indirect contact with the catalyst and reactants to supply heat thereto during the processing step and in indirect contact with the catalyst and reactivating fluid during the reactivating step to abstract heat therefrom.

Adiabatic catalytic cracking, for example, which is much more trouble free and less expensive than the type employing a circulating convective fluid, is made possible and profitable by the use of reactors of the type herein provided, although it has not heretofore been economically feasible. Furthermore, reactors of this type, by virtue of the adiabatic type of operation which they permit, make relatively small capacity catalytic cracking operations profitable for the first time, thus opening this field to the small refiner.

The accompanying drawing diagrammatically illustrates one specific form of the improved reactor provided by the invention. The features and advantages of the invention will be apparent with reference to the drawing and the following description thereof.

In the drawing Fig. 1 is an elevational view, shown principally in section, of a reactor incorporating the features of the invention.

Figure 1:
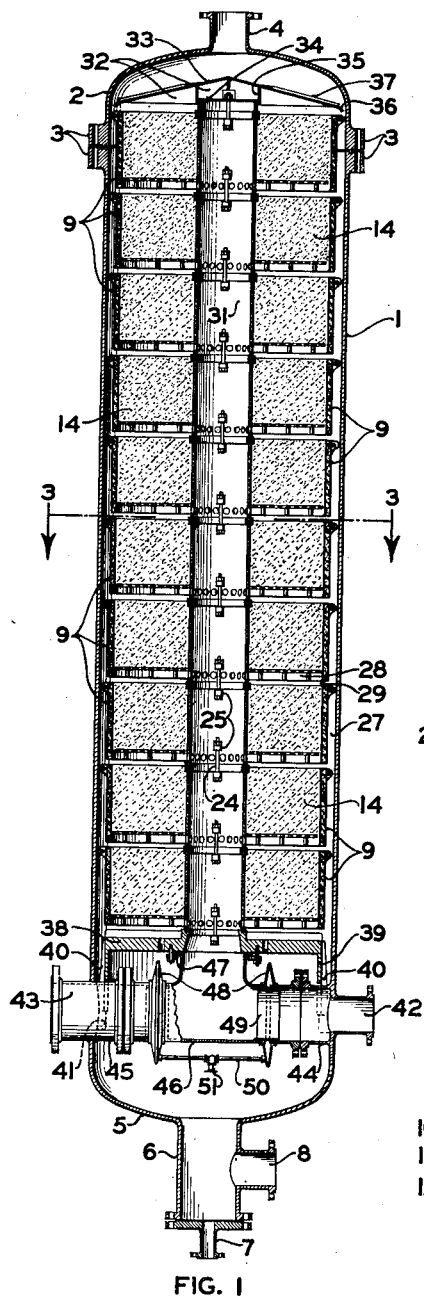

Referring to the drawing, the reactor here illustrated comprises a cylindrical outer shell 1 provided with a semi-elliptical upper head 2 which is removable from the shell and secured thereto by companion flanges 3 provided on the shell and head. An inlet nozzle 4, through which the reactants to be processed and reactivating gases are admitted to the interior of the reactor, is provided on the upper head 2. The vessel is also provided with a semi-elliptical lower head 5 which, in this instance, is integral with shell 1 and is provided with nozzle 6 having a flanged bottom outlet 7 and a flanged side inlet 8. The bottom outlet 7 serves as a drain and for removing heavy liquids from the vessel, as will be later described, and inlet 8 is provided for the admission of another stream of reactivating gases to the vessel.

The entire vessel is constructed of suitable metal or alloy capable of withstanding the operating conditions to which it is subjected, but the present invention is not concerned with the particular type of material employed and its composition may be varied to suit requirements.

Figure 3:
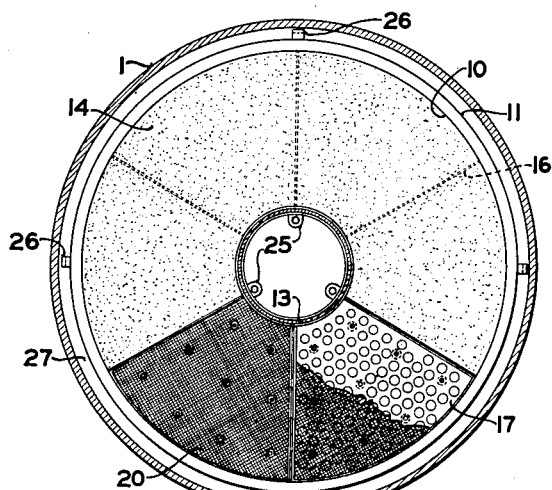
Fig. 3 is a cross-sectional view of the reactor illustrated in Fig. 1, taken along the plane indicated by line 3—3 in Fig. 1, and illustrates a plan view of one of the catalyst trays with the catalyst removed from a portion of the tray to show the catalyst-retaining means.
Figure 2:
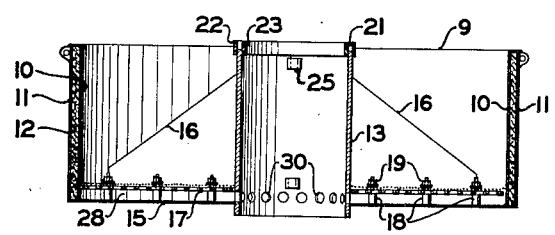
Fig. 2 is a sectional elevation of one of the catalyst trays, 9 of Fig. 1, the catalyst being omitted in this particular view.

The particular reactor here illustrated is provided with ten substantially identical superimposed catalyst trays, each designated by the reference numerals 9 and shown in enlarged detail in Figs. 2 and 3. The cylindrical outer wall 10 of each tray is formed of concentric inner and outer metal sheets or plates 10 and 11, respectively, with a space provided therebetween which is closed at its upper and lower ends and filled with a suitable heat insulating material 12, such as, for example, slag wool, rock wool, glass wool, exfoliated vermiculite, or the like.

Each of the trays 9 has a central tubular member 13 concentric with and spaced from the outer walls of the tray to provide an annular space therebetween for the reception of the bed of catalyst or contact material indicated at 14 in Figs. 1 and 2. Member 13 of each tray extends from approximately the upper extremity of the outer walls of the tray to slightly beneath their lower extremity and is joined to the outer walls by an imperforate bottom plate 15 and a plurality of radial reenforcing ribs 16 which serve to stiffen plate 15 and keep conduit 13 aligned with the outer walls.

A plurality of segment shaped perforate plates 17 is provided between adjacent stiffening ribs 16 and each of these plates extends from adjacent the central conduit 13 to adjacent the outer wall of the tray. The perforate plates are disposed a short distance above and supported on bottom plate 15 by means of suitable spacing members 18 to which the plates are bolted, as indicated at 19 in Fig. 2. When the solid particles of catalyst or contact material are sufficiently large to be retained on the perforate plate 17 without clogging the latter, no additional means will be required for retaining the catalyst in the trays. Ordinarily, however, the catalyst particles will be relatively small and a screen or the like of sufficiently small mesh, indicated at 20 in Fig. 3, is provided over the perforate plates 17 to retain the catalyst particles.

An annular groove 21 is provided at the upper end of the cylindrical member 13 of each tray, this groove being formed between ring-shaped metal members 22 and 23 which are welded or otherwise secured in any convenient manner to the upper end of member 13 with their upper ends projecting thereabove. When the trays are assembled in superimposed relation within the reactor shell, each of the grooves 21 receives the lower end of member 13 of the next higher tray in the assembly and, when desired, suitable packing, not illustrated, may be provided within the grooves.

The trays may be clamped firmly together by means of bolts 24 which pass through lugs 25, provided at spaced points around the inner circumference of member 13 adjacent the opposite ends of the latter or, when desired, these bolts may be replaced by pins which pass through the openings in lugs 25 and keep the trays in alignment but do not clamp them together, the weight of the trays and catalyst making clamping of the trays unnecessary in most cases. Other suitable lugs or ears 26, provided at spaced points about the circumference of outer wall 11 of the trays adjacent their upper ends, serve to space the trays within the shell so that an annular space 27 of substantially uniform cross-sectional area is provided therebetween, the external diameter of the trays being somewhat smaller than the interior diameter of shell 1. The lugs 26 also serve as means of grasping the trays for lowering the same into and removing them from the vessel.

In addition to the space 28, provided between the perforate plates 17 and the bottom plate 15 of each tray, member 13 projects a sufficient distance beneath plate 15 that a space 29 is provided between the bottom of each tray and the top of the succeeding lower tray of the assembly. Each of the spaces 29, between the trays, communicates directly with the annular space 27 around the trays and the spaces 28 and 29 communicate only through the catalyst bed on the tray and the perforate supporting members 17 and 20. The space 28 in each tray also communicates, through openings 30 provided in that portion of the wall of member 13 projecting through space 28, with the space 31 enclosed by the tubular members 13. Since members 13 are joined end to end in the assembly and are open at their opposite ends, the space 31 is continuous from one end of the assembly to the other. The several members 13 thus form a continuous central conduit through the tray assembly which is in communication with the annular space 27 around the trays through spaces 29, the catalyst beds, the screen 20 and perforate plates 17, spaces 28 and openings 30.

Figure 4:
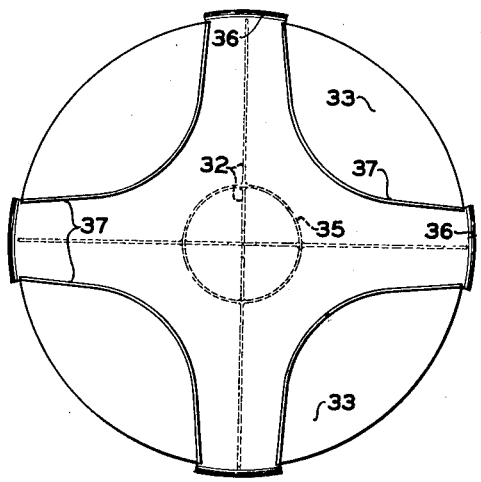
Fig. 4 is a plan view of member 33 of Fig. 1.

The space 31, enclosed by members 13, is closed at its upper end by means of a suitable cap 34 shown in section in Fig. 1. A baffle, shown in section in Fig. 1 and in plan in Fig. 4, is disposed above the uppermost tray in the reactor and comprises, in the case here illustrated, a relatively shallow cone shaped member 33 having a depending central collar 35, the lower end of which slips over cap 34 with the radial stiffening ribs 35 resting on the top of the cap to space the baffle from the uppermost tray. The base area of member 33 is substantially coextensive with the circular cross-sectional area of the trays and member 33 is provided at spaced points about its circumference with lips 36 extending outwardly to adjacent the inner surface of the wall of the reaction vessel. Substantially semi-circular or curved members 37, projecting upwardly from the upper surface of member 33 and terminating adjacent the edges of lips 36, are provided for directing liquids, in the stream of vaporous reactants supplied to the reactor through nozzle 4, over the surface of member 33 to the lips 36, from which the liquid is directed against the surface of the inner wall of the vessel, over which it flows downwardly to be removed from the lower end of the vessel through outlet connection 7. Thus, a major portion of all or of any entrained heavy liquid particles in the stream of heated vaporous hydrocarbons supplied to the reactor are prevented from contacting the catalyst or contact material in the trays. This is particularly advantageous as applied to reactions, such as catalytic cracking, in which the entrained heavy liquid particles tend to form deleterious carbonaceous or heavy hydrocarbonaceous deposits in the catalyst mass.

The entire tray assembly, as illustrated in Fig. 1, is supported only at its lower end and carried by a heavy circular plate 38 upon which the tray assembly rests. Member 38 is provided with a depending skirt 39 which serves as a stiffening ring or flange and on which spaced lugs 40 are provided. The spaced lugs 40 rest upon a ring-shaped supporting member 41 which is welded or otherwise firmly secured to the cylindrical shell 1 adjacent its lower end. Thus, the weight of the entire tray assembly and the beds of catalyst or contact material is transmitted to the shell of the vessel at one elevation and the assembly is free to expand and contract, with temperature changes encountered during service, independent of expansion and contraction in shell 1.

Flanged outlet nozzle 42 for removing products resulting from conversion of the reactants from the vessel, and flanged outlet nozzle 43 for removing spent or partially spent reactivating gases from the vessel are provided adjacent the lower end of shell 1 at diametrically opposite points thereon. Nozzles 42 and 43 project outwardly from shell 1 and communicating inwardly projecting flanged nozzles 44 and 45, respectively, are provided within the shell. A T-shaped member 46 with the opposite ends of its run flanged and joined to the flanges of nozzles 44 and 45 and with its side connection pointing upward, flanged at its upper end and bolted to member 38, as illustrated at 47, establishes communication between nozzles 42 and 43 and the central space 31 of the tray assembly, member 38 having a central opening therethrough corresponding with that of the side connection of T 46. Expansion joints of the flexible or corrugated type are provided in the run of T 46 on opposite sides of the side connection to accommodate longitudinal expansion and contraction of the T and of nozzles 44 and 45, as well as circumferential expansion and contraction of shell 1. The use of expansion joints of this class, rather than a telescopic type of joint, for example, is particularly desirable since the joints 48 will also accommodate any minor deflection caused in member 38 by the superimposed load of the tray assembly. In the particular case here illustrated, a sleeved-like member 49 is provided within T 46 at each of the expansion joints. The sleeves 49 are preferably joined by welding or in any other convenient manner to the conduit comprising T 46 on one side of the expansion joint which they serve and are slidably engaged with the conduit on the opposite side of the expansion joint. They serve to cover or close the recesses within the flexible member of the joint to prevent the accumulation of solid or semi-solid materials therein which would interfere with the operation of the joint. As an additional precaution and to keep the joints relatively cool, relatively inert gas, such as steam, for example, may be admitted to the joints through conduit 50 which is connected with the flexible members thereof and communicates with an inlet nozzle, not illustrated, in shell 1. Steam or other relatively inert gas may also be admitted through conduit 50 and nozzle 51 provided therein to the lower space of the reactor beneath the tray assembly, whereby this space is flooded with inert gas during processing of the hydrocarbon reactants within the reactor.

The following description will serve to further illustrate the advantages of the reactor herein provided as applied to adiabatic endothermic and exothermic operations alternately conducted in the reactor.

Assuming, for example, that the conversion reaction to be conducted is catalytic cracking and that reactivation of the catalyst is accomplished with hot combustion gases containing controlled minor amounts of air: During the processing step previously heated and substantially completely vaporized hydrocarbons to be cracked are admitted to the reactor at a temperature suitable for conducting the cracking reaction through the upper nozzle 4 and, upon contact with the cone-shaped deflecting and distributing member 33, heavy unvaporized or entrained liquid particles are directed over the surface thereof to lips 36 from which they are directed against the inner surface of the cylindrical wall of the vessel, flowing downwardly thereover to be collected momentarily in the lower nozzle connection 6 and withdrawn therefrom through nozzle 7, together with steam supplied during this portion of the operating cycle to the lower portion of the reactor through conduit 50 and nozzle 51.

The heated vaporous reactants pass around the lips 36 of member 32 and flood the spaces 27 and 29 about and between the catalyst trays. They pass from spaces 29 as a plurality of separate streams of substantially equal volume into the catalyst beds on the several trays wherein the catalytically promoted cracking reaction takes place.

Insulation of the side walls of the trays serves to materially retard cooling of the heated vapors, by contact with the trays, as they pass from the upper end of the vessel through space 27 to the spaces 29 between the trays, so as to maintain the temperature of the reactants entering each catalyst bed substantially uniform. Insulation is also preferably provided about the outer surface of the shell and heads of the reactor to retard the loss of heat, but it is not illustrated in the drawing since it may be of conventional form.

The products of the cracking reaction accomplished in the catalyst beds flow therefrom through screens 20 and the perforate plates 17 into the spaces 28 and therefrom through openings 30 in members 13 into the central conduit 31 formed by the latter, wherein the streams from the several catalyst beds are joined. The commingled stream of conversion products is directed through T 46 from the reactor through nozzles 44 and 42 to suitable recovery equipment which is not a part of the present invention and is therefore not illustrated.

At the conclusion of the process step of the operating cycle, the supply of heated hydrocarbon reactants to the vessel is discontinued and a suitable purging gas, such as superheated steam, oxygen-free combustion gases or the like, is admitted to the reactor through nozzles 4 and 8 to purge the reactor and the catalyst beds of fluid hydrocarbons. The purging gases flood the spaces 27 and 29 and pass downwardly from the latter as a plurality of separate streams through the catalyst beds to spaces 28 wherefrom they are directed into the central conduit 31 and thence from the reactor through T 46 and nozzles 45 and 43.

Following the purging step of the cycle, reactivating gases are admitted to the upper and lower ends of the reactor through nozzles 4 and 8, respectively, at a temperature suitable for initiating combustion of the deleterious deposits left in the catalyst beds during the preceding processing step of the cycle. The reactivating gases pass through space 27 about the trays from the top and bottom portions of the reactor into the spaces 29 between the trays, from which they flow into the catalyst beds and burn the deposited combustible material therefrom. The resulting spent or partially spent reactivating gases and combustion products pass through members 17 and 20 into the spaces 28 beneath the catalyst beds in the trays, wherefrom they flow through the openings 30 communicating therewith into the central conduit 31. They are discharged from the latter through T 46 and from the reactor through nozzles 45 and 43.

During reactivation, as in processing, the insulated trays materially assist in maintaining substantially uniform temperature conditions in the several catalyst beds. Without insulation of the trays, as herein provided, substantial quantities of heat would be transferred from the catalyst beds undergoing reactivation to the reactivating gases passing through space 27 before they enter the catalyst beds, with the result that reactivating gases entering the trays adjacent the central portion of the assembly would be considerably hotter than those entering the trays near the ends of the assembly. This would be dangerous with most cracking catalysts since it is apt to result in exceeding the peak temperature to which the catalyst can be subjected without permanently impairing or destroying its catalytic activity. Furthermore, non-uniform temperatures, with respect to the several catalyst beds, is particularly undesirable when the reactivation is conducted adiabatically since, in this type of operation, the heat carrying capacity of the spent reactivating gases is relied upon to prevent an excessive temperature rise in the catalyst beds, the exit gases carrying away a large portion of the exothermic heat of reactivation from the catalyst beds. For this reason, it is more economical to reactivate the catalyst at a temperature relatively close to the maximum permissible, in order to avoid an excessively lengthy reactivating period and avoid the circulation of excessively high quantities of inert gases in the reactivating gas stream. Obviously, if substantially uniform temperature conditions are maintained in the several catalyst beds during reactivation, as provided by the invention, the average temperature may more closely approach to the maximum permissible temperature without the danger of exceeding this permissible maximum in any portion of the catalyst mass.

Following the reactivating step of the cycle, the reactor is substantially purged of oxygen-containing gases in the same manner, above described, as it is purged of fluid hydrocarbons following the processing step. The reactor is then ready for further use in conducting the cracking reaction.

The reactor herein provided, by virtue of its construction and arrangement, is particularly advantageous as applied to conversion reactions which are best conducted at relatively low pressure. By subdividing the catalyst bed into a plurality of relatively shallow beds and subdividing the stream of reactants to be converted into a corresponding number of smaller streams, each of which is passed through an individual catalyst bed, pressure drop through the catalyst mass is materially decreased as compared with an operation in which the entire stream of reactants is passed through the entire mass of catalyst in a deep bed. This not only decreases the average pressure which must be maintained in the reaction zone, but also makes for more uniform pressure through the reaction zone and consequently better control of the conditions under which the reaction is accomplished.

In the reactor illustrated, the areas of the inlet and outlet connections, as well as that of the spaces through which the reactants flow prior to entering the catalyst bed and that of the spaces through which the reaction products flow following their discharge from the catalyst bed, are sufficiently large that they offer only nominal resistance to flow. The catalyst beds in the trays are also relatively shallow and of sufficiently large cross-sectional area that they off no great resistance to the flow of reactants and reactivating gases therethrough. Preferably, the openings 30 through which communication is established between the central conduit and the spaces beneath the catalyst beds in the trays are of such size that a measurable pressure drop is encountered by the fluid products passing therethrough. This, coupled with low resistance to flow in other portions of the reactor results in substantially uniform distribution of the reactants and reactivating gases to the several catalyst beds.

In addition to the above mentioned advantages, which result from the general structural form and arrangement of the reactor, many of the structural details have important advantages, some of which have been above mentioned. The advantages of a baffle and distributing member above the uppermost tray which functions as a deflecting baffle for the incoming reactants and reactivating gases and as a means of directing heavy liquids against the walls of the vessel have been previously mentioned and, as a result of keeping heavy liquids in the incoming stream of vaporous reactants from contacting the catalyst, deleterious heavy deposits in the catalyst beds are materially decreased.

The means provided for supporting the entire tray assembly from one end and transmitting the load to the lower portion of the reactor shell is particularly advantageous in that it permits longitudinal expansion and contraction of the tray assembly independent of longitudinal expansion and contraction in the shell of the vessel, eliminating strains due to any unequal expansion and contraction between the shell and tray assembly.

The construction of the individual trays, including the relatively heavy central conduit to which the load of the entire tray and the superimposed trays is transmitted, as well as the radial stiffening ribs, the segment shaped perforate plates and the concentric outer walls with insulation disposed therebetween are important features of the invention.

The construction at the lower end of the vessel, comprising the diametrically opposed outlet nozzles, the connecting T-shaped member with its flexible or corrugated type expansion joints and the manner in which this member is rigidly connected with the central conduit of the tray assembly without imposing the weight of the tray assembly on the outlet nozzles are also important features of the preferred form of reactor provided by the invention.

It will be understood that although many of the individual features provided by the invention are particularly advantageous in combination, mutually contributing to produce the desired results, they may also have inherent advantages per se or in combination involving less than the entire invention. The invention is, therefore, not limited to the entire combination of the many features disclosed.

I claim as my invention:

1. A reactor comprising a cylindrical shell; a plurality of superimposed annular trays within and spaced from the shell; each of said trays comprising an outer cylindrical wall, a central open-ended tubular member within and spaced from said outer wall and protruding below the lower end of the outer wall, a horizontal annular closure plate joining the lower end of the outer wall with said tubular member at a point above the bottom of the latter, and a horizontal perforate annular retaining member between the outer wall and the tubular member and disposed above and spaced from said closure plate; means forming an annular groove at the upper end of each of said tubular members; the lower protruding end of the tubular member of an upper one of said trays being disposed in the annular groove of the tubular member of the next lower tray, thereby forming a vertical central conduit within said shell; apertures in said central conduit in the portion of each of said tubular members between the closure plate and the perforate retaining member; means for introducing fluid to said shell; and a second conduit extending through an end portion of the shell at right angles to and in communication with said central conduit.

2. A catalytic reaction vessel comprising in combination a series of trays, each of said trays comprising a substantially cylindrical outer wall, a concentric substantially cylindrical central member of lesser diameter and extending below said outer wall, a bottom plate joining the outer wall from its bottom to the cylindrical inner member in such manner that a projecting tongue is formed by the lower end of said inner member, a perforated plate disposed above said bottom plate, said central member having openings provided through its wall at points between the bottom plate and the perforated plate, said central cylindrical member being provided with engaging means disposed in the upper end thereof, said trays being disposed in a cylindrical shell with closed ends so that the tongue at the lower end of the central cylindrical member of each tray engages with the engaging means disposed in the upper end of the cylindrical center member of the tray below it, said shell being of larger diameter so that an annular space is formed between the walls of the trays and the shell, means for admitting fluids in the upper end of the shell, a conduit passing through said shell spaced above its lower end and at right angles to the central conduit formed by the central inner members of the trays and in communication with said central conduit thus formed, and means for admitting fluids in the lower end of said shell.

3. A reactor comprising a cylindrical shell; a plurality of superimposed annular trays within and spaced from the shell; each of said trays comprising an outer cylindrical wall, a central open-ended tubular member within and spaced from said outer wall and protruding below the lower end of the outer wall, a horizontal annular closure plate joining the lower end of the outer wall with said tubular member at a point above the bottom of the latter, and a horizontal perforate annular retaining member between the outer wall and the tubular member and disposed above and spaced from said closure plate; engaging means at the upper end of each of the tubular members for engaging the protruding lower end of the next higher tubular member; each of said tubular members having openings through its wall between the closure plate and the perforate retaining member; means for introducing fluid to said shell; and a conduit extending through the lower portion of the shell above the bottom thereof at right angles to and in communication with the central conduit formed by the central tubular members of said trays.

PERCY MATHER.